Nov. 13, 1951 J. H. DUNAWAY ET AL 2,575,166

AZIMUTH MEASURING DEVICE

Filed Dec. 20, 1947 2 SHEETS—SHEET 1

INVENTORS
Paul B. Powell
James H. Dunaway
BY Dwight C. Otis
AGENT.

Nov. 13, 1951 J. H. DUNAWAY ET AL 2,575,166
AZIMUTH MEASURING DEVICE
Filed Dec. 20, 1947 2 SHEETS—SHEET 2

Paul B. Powell  INVENTORS.
James H. Dunaway
BY Dwight C. Otis

AGENT.

Patented Nov. 13, 1951

2,575,166

UNITED STATES PATENT OFFICE 2,575,166

AZIMUTH MEASURING DEVICE

James H. Dunaway and Paul B. Powell, Houston, Tex., assignors, by mesne assignments, to Standard Oil Development Company, Elizabeth, N. J., a corporation of Delaware Application December 20, 1947, Serial No. 792,988

3 Claims. (Cl. 33—61)

The present invention relates to a geometrical instrument. More particularly the invention relates to an azimuth measuring device suitable for use in navigation and hydrographic surveying.

In navigating a ship close to shore or in hydrographic surveying work, it is often desirable to maneuver a ship along a predetermined course. This is ordinarily done with the aid of the ship's compass. However, because of the varying effects of winds, tides and local tidal currents it is not always possible to maintain the ship on its true course with the aid of the compass alone. Accordingly, it is usual practice to fix the bearing and position of the ship, from time to time, with respect to known celestial or terrestrial objects or both. This may be done with the aid of auxiliary instruments such as an azimuth circle, a pelorus or, in some instances, a sextant.

These instruments of the prior art, however, have certain disadvantages when used in hydrographic surveying or in piloting in closed waters. For example, when surveying close to shore, as is often done in marine geophysical prospecting work, it frequently happens that the number of "targets" or elevated landmarks of known position on shore are few and far between. Accordingly, in cases of this sort, it may be difficult to fix the position of the surveying ship by means of a sextant since three targets, preferably separated from each other at the point of observation by angles in excess of 30 degrees are required. With the apparatus of the present invention, a fix may be obtained from only two targets. If means, such as a wire line or radar, is available to indicate distance in conjunction with measurements of angles made with a sextant, a fix may be obtained with respect to two targets. Only one target is required with the device of the present invention when radar or wire line measurements are available.

Similarly, when running a specified course simultaneous observations with two sextants, or two corrected successive observations with one sextant, are necessary whereas only a single observation with the instrument of the present invention is necessary.

Although a pelorus or an azimuth circle is commonly used to obtain information of the nature obtainable from the device of the present invention, our novel device has particular advantages over these devices of the prior art. For example, an azimuth circle is generally employed directly with a ship's compass and consequently is generally not in a position where it may be sighted upon a target bearing rearwardly from the ship's bridge. Similarly, although the pelorus is usually fixed in a more favorably located position than is the ship's compass, it is frequently located in such a manner that objects upon which it is desirable to sight are obscured by the superstructure of the ship or some other object. The device of the present invention on the other hand is portable and can be readily carried and used at will at any point on a ship. The portability of the device of the present invention makes possible the procurement of more accurate readings than can be obtained from a fixed pelorous in rough weather since our novel device may be steadied in the hands of the observer.

The apparatus of the present invention may best be understood from the accompanying drawing, in which.

Figure 1:
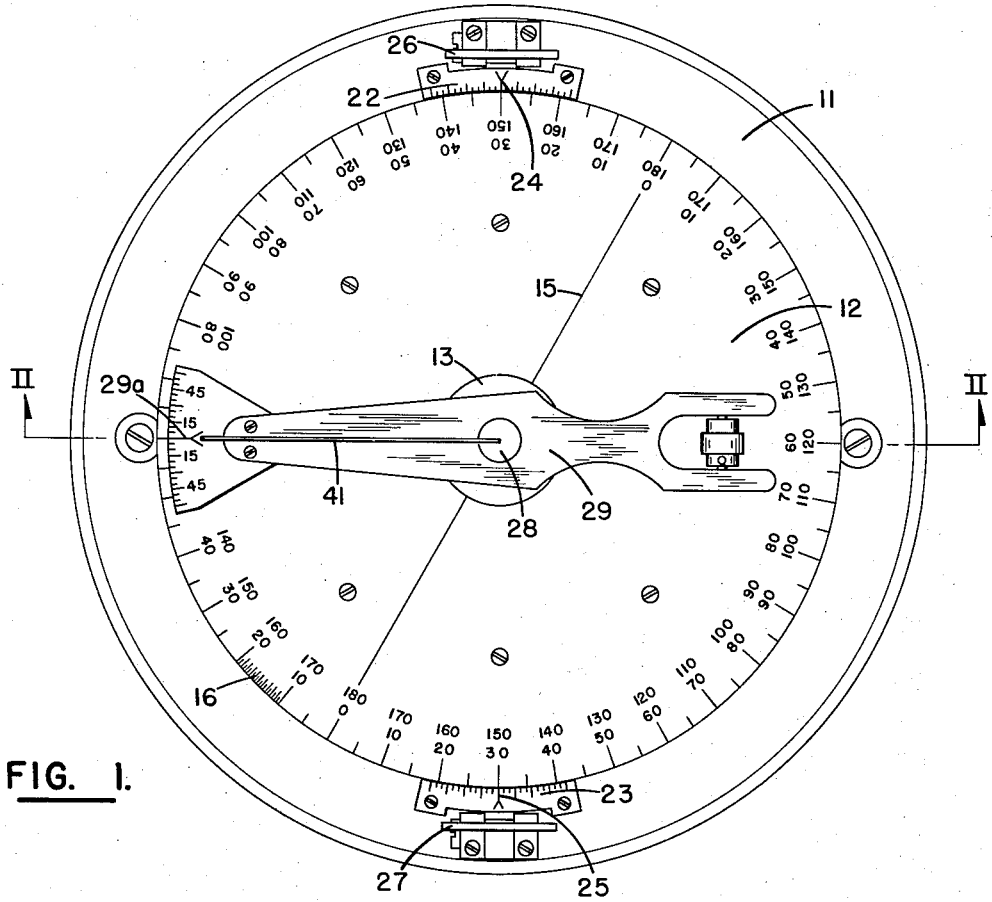
Fig. 1 is a plan view of one embodiment of the apparatus of our invention.
Figure 2:
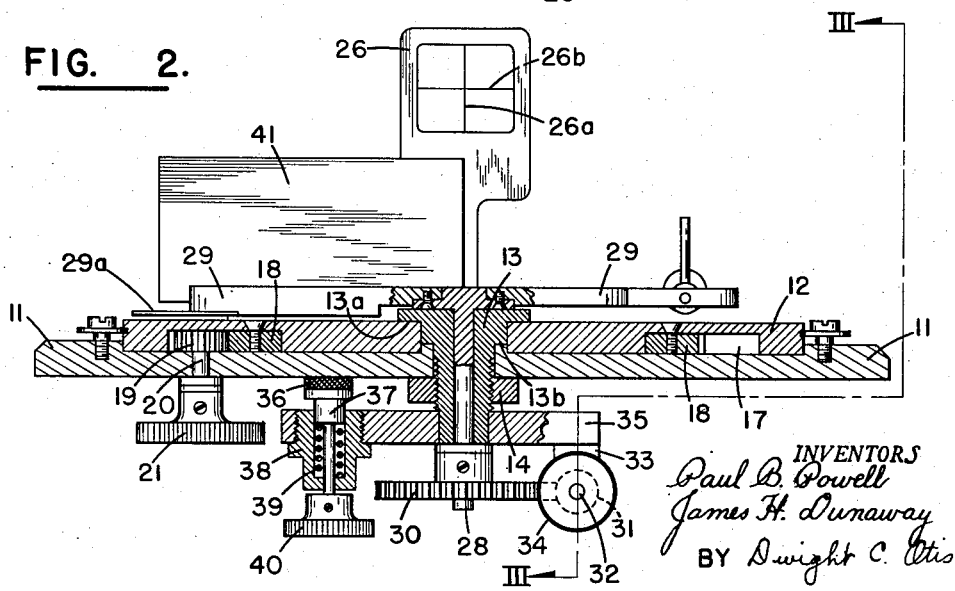
Fig. 2 is a side elevation view, partly in section, taken along the line II—II of Fig. 1.
Figure 3:
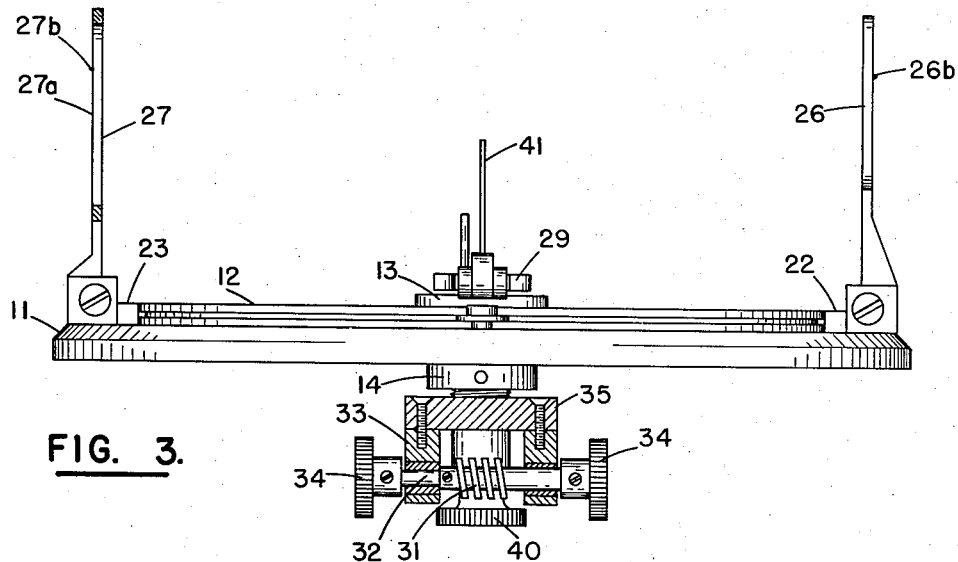
Fig. 3 is another side elevation view, partly in section, taken along the line III—III of Fig. 2.

Referring first to Figs. 1, 2, and 3 the numeral 11 designates a flat base plate which is normally oriented in a horizontal plane when the apparatus is in use and, for purposes of description, plate 11 will be assumed to be in a horizontal plane. A flat disc member 12 is mounted adjacent and in a plane above and parallel to plate 11 by means such as a bushing 13 having a retaining shoulder 13a and a seating shoulder 13b which seats against plate 11 in a manner such that disc 12 is free to rotate about its center. Bushing 13 may be held firmly in place near the center of plate 11 by means of a retaining nut 14 on the under side thereof substantially as illustrated in Fig. 2.

The upper face of disc 12 is suitably marked or engraved with meridian line 15 coinciding with a diameter thereof. The entire circumference of this upper face is also suitably marked or engraved with equally spaced divisions 16, preferably corresponding to each half degree of a circle. As shown in Fig. 1, markings corresponding to each 10° division are preferably numbered from 0 to 180 throughout the range on each half of the scale, with the 0° and 180° marks coinciding with the extremities of the meridian line 15.

The lower face of protractor disc 12 is provided with an annular groove 17 in which is securely mounted a ring gear 18 which is concentric with respect to bushing 13 and the central axis of disc 12. A pinion gear 19 affixed to a shaft 20 is arranged in annulus 17 in a manner to engage ring gear 18. Shaft 20 extends downwardly through a bearing surface in plate 11 and terminates in a suitable knob 21. By rotating knob 21 adjacent the under side of plate 11, protractor disc 12 may be made to rotate about bushing 13.

Affixed to plate 11 adjacent the perimeter of disc 12 and upon diametrically opposite sides of the center thereof are two blocks 22 and 23 having marked thereon index lines 24 and 25, respectively, which are exactly aligned along a diameter of disc 12. Preferably, blocks 22 and 23 have vernier indicator lines marked thereon as shown adjacent lines 24 and 25 in the drawing. Also affixed to plate 11 adjacent blocks 22 and 23 are sighting members 26 and 27, respectively. Hereinafter, member 26 may be referred to as the far sight since in use it is generally farther from the observer's eye than is member 27 which may be referred to as the near sight. Members 26 and 27 are preferably provided with vertical rigid wires 26a and 27a, respectively, aligned in an imaginary plane which would be vertical to disc 12 and would include index lines 24 and 25. Members 26 and 27 are also preferably provided with horizontal rigid wires 26b and 27b which may be in an imaginary plane parallel to the upper surface of disc 12.

Although members 26 and 27 have been illustrated as provided with vertically and horizontally oriented cross wires, it will be understood that other equivalent means may be substituted. Thus, members 26 and 27 may be arranged as conventional peep sights. However, as will appear subsequently from a description of the manner of using the device of this invention, if horizontal indicia 26b and 27b are omitted, other means such as a spirit level may be suitably mounted upon plate 11 to indicate horizontal orientation thereof.

Figure 4:
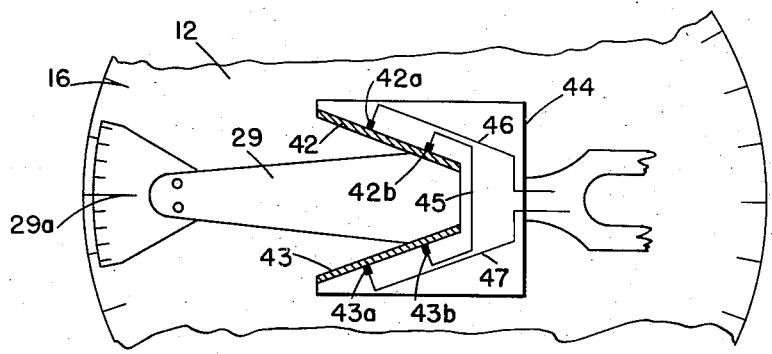
Fig. 4 is a plan view, partly in section, showing elements which may be substituted for certain elements of Fig. 1 in another embodiment of our invention.

Passing through bushing 13 along the central axis thereof and perpendicular to disc 12 is a shaft 28 having rigidly affixed to the upper end thereof a flat member 29 defining an index 29a which lies upon a radial line perpendicular to shaft 28. While member 29 has been shown in the drawing as an elongated arm, it is to be understood that member 29 may, if desired, be a suitable disc or plate having, adjacent protractor scale markings 16, a suitable index line 29a which lies along one radius thereof. So that accurate readings may be made, a vernier scale corresponding to each 5 minutes of a circle is preferably provided adjacent index 29a shown in Fig. 1. Since in a practical embodiment of the invention such as is shown in Figs. 1 and 4, no line might actually be drawn upon member 29 along the radius terminating at index means 29a, and since frequent reference will be made hereinafter to a line that could be so drawn, for purposes of description this particular radius will be referred to as "radial index line 29b."

The lower end of shaft 28 is preferably affixed to a gear 30 which is arranged to mesh with and be driven by a worm gear 31. Worm gear 31 is affixed to a shaft 32 rotatably mounted in a bracket 33. Knobs 34 may be affixed to the ends of shaft 32 in order that the latter may be readily turned as desired. Bracket 33 is rigidly mounted upon the under side of bracket plate 35 which, in turn, is rotatable about the lower end of bushing 13 in a plane substantially parallel to plate 11. In order to control rotatability of bracket plate 35, the latter is preferably provided with a resilient brake member 36 which may be fabricated from rubber, leather or the like. Conveniently, member 36 may be affixed to a spring loaded ram 37 which is held in position on bracket arm 35 by retainer 38 containing spring 39. A knob 40 is preferably provided upon the shaft of ram 37 so that brake 36 can be disengaged from contact with plate 11.

By reference to the foregoing description and the drawing it will be seen that, by disengaging brake 36, bracket arm 35 may be rotated freely upon bushing 13. However, since worm gear 31 is bracketed to arm 35 and is also engaged with gear 30 which, in turn, is connected to member 29 by means of shaft 28, any rotation of arm 35 causes identical rotation of member 29. Likewise it will be seen that, when brake 36 is engaged so that arm 35 does not move, rotation of knob 34 and worm gear 31 causes rotation of gear 30, shaft 28, and member 29 relative to plate 11. In other words, movement of member 35 can be used for coarse or rapid positioning of member 29 and radial index line 29b while rotation of knob 34 can be employed for fine adjustment of the positioning.

In the embodiment of our invention illustrated in Figs. 1, 2 and 3, a thin, polished vane 41 is securely affixed to member 29 along the radial index line 29b in such a manner that vane 41 forms a plane which is perpendicular to disc 12. Vane 41 is preferably constructed of highly polished metal which is thin but rigid enough to withstand reasonable handling without liability of bending. Although its dimensions are not critical, vane 41 is preferably of sufficient length so that it may be mounted with one end adjacent the circumference of disc 12 and with the other end adjacent the center of disc 12. Its width should preferably be such that it does not obstruct vision along a line from the junction of indices 27a and 27b to the junction of indices 26a and 26b.

As will become clear from subsequent description of the method for using the device of the present invention, vane 41 is responsive to illumination from, and serves as an aligning means for indicating precise alignment of the radial index line 29b with the azimuth of, a major celestial body such as the sun, or in some instances, the moon. The outer end of vane 41 may in itself serve as index means 29a in conjunction with marks 16 to indicate the relative position of radial index line 29b with respect to meridian line 15 and index lines 24 and 25.

Figure 5:
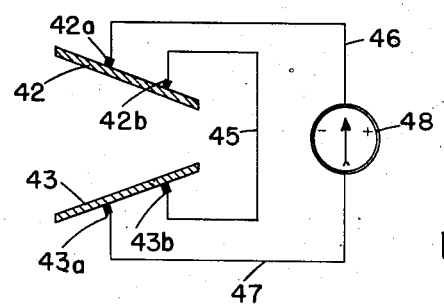
Fig. 5 is a schematic diagram representing the electrical circuit of elements shown in Fig. 4.

Turning now to Figs. 4 and 5, a photoelectric or photovoltaic means, which also is responsive to illumination from a major celestial body and which may be employed in place of vane 41 to indicate alignment of the longitudinal axis of member 29 with respect to a major celestial body, is shown. As mentioned heretofore, Fig. 4 is a plan view, partly in section. It is to be understood that the embodiment to be described in conjunction with Figs. 4 and 5 employs all of the elements described with respect to Figs. 1, 2 and 3 except vane 41. Accordingly, for purposes of simplification of the drawing, none of the elements except member 29 and a portion of disc 12 illustrated in Figs. 1, 2 and 3 has been shown in Fig. 4.

The numerals 42 and 43 designate substantially flat photovoltaic surfaces having positive terminals 42a and 43a and negative terminals 42b and 43b, respectively. As will be seen from Fig. 4, the photoelectric elements are mounted within a suitable housing member 44 and housing 44 is secured to member 29 in a manner such that the surfaces 42 and 43 lie in two intersecting planes which define an acute angle. They are also mounted so that the planes are perpendicular to disc 12, and radial index line 29b bisects the acute angle formed by the planes. Housing 44 may be mounted at any desired point along radial index line 29b; however, it is preferably mounted so that the intersection of planes defined by surfaces 42 and 43 will lie approximately above the center of disc 12.

As is well known in the prior art, photovoltaic surfaces 42 and 43 when exposed to light energy generate direct current potentials and form cells having positive and negative terminals 42a, 43a and 42b, 43b, respectively. In accordance with one embodiment of our invention, negative terminals 42b and 43b may be connected together by a conductor 45. Positive terminals 42a and 43a may be connected by flexible conductors 46 and 47, respectively, to a sensitive galvanometer 48 (see Fig. 5). Meter 48 is preferably of the type wherein an indicating pointer registers zero deflection substantially in the middle of a graduated scale and may register deflection upon either side of the null point depending upon the direction of flow of current through the meter. By connecting photovoltaic surfaces 42 and 43 to meter 48 in opposition to each other as described above, it will be apparent that, if surfaces 42 and 43 receive equal illumination, the indicating pointer of galvanometer 48 will not be deflected. On the other hand, if one photovoltaic surface receives greater illumination than the other, the galvanometer pointer will be deflected. In using the device of our invention member 29 is rotated so that surfaces 42 and 43 are directed toward a luminous, major celestial body and receive equal illumination therefrom as indicated by a null reading upon meter 48. Provided cells 42 and 43 have been suitably compensated electrically, if necessary, index 29a will indicate, in conjunction with the marks upon the circumference of disc 12, the bearing of the celestial body with respect to disc 12.

It will be apparent that meter 48 may be placed in any convenient location with respect to base plate 11. In a preferred embodiment (not shown in the drawing), however, meter 48 is mounted upon plate 11 adjacent far sight 26 where its scale is readily seen when the device of the invention is in use.

To illustrate the method of using the device of the present invention let it be assumed that it is desired to determine the bearing of a ship's course with respect to a fixed terrestrial object which is visible from the ship's deck. The observer holds the plate 11 at suitable height so that he may align the junctions of cross wires 26a, 26b and 27a, 27b upon the object and at the same time aligns horizontal wires 26b and 27b with the horizon line of the earth. Vane 41 is then adjusted with respect to the sun by suitable movement of arm 35 or knob 34 or both until the vane casts a shadow of minimum width upon member 29 rearwardly of vane 41. In conducting this adjustment it will usually be observed that, when one side of vane 41 is oriented slightly across the path of the sun's direct rays, a bright streak of light will be reflected rearwardly of vane 41 onto disc 12 or the rearward extension of member 29. Simultaneously a shadow having a shape similar to the bright reflection streak will also appear upon the opposite side of the member or arm. When vane 41 is further adjusted into perfect parallelism with the path of the sun's rays, the bright streak and shadow merge into a thin shadow of approximately the same thickness as vane 41. Vane 41 is henceforth held in the adjusted position by brake member 36 in frictional engagement with plate 11. With this adjustment completed, the exact time of day at which the measurement was made, is noted and the azimuth of the sun for the particular time of day, season of the year and for latitude of position is determined from a table such as the well known Hydrographic Office publication H71, "Azimuths of the Sun." By rotating knob 21, the required azimuth mark (as determined from the above-mentioned table) is adjusted into alignment with vane 41. The bearing of the fixed object with respect to the ship's course may then be read from the scale on disc 12 where the latter intersects index line 24.

If it is desired to check the course which a ship is following with the course which has been laid out upon a chart, disc 12 is first rotated until the desired azimuth of the course with respect to the true poles of the earth appears on disc 12 opposite index line 24. The exact azimuth of the sun for the time of the particular day and latitude when the measurement is to be made is noted from a proper table in the Hydrographic Office publication H71, and vane 41 is adjusted by means of arm 35 and knob 34 until the tip of vane 41 or index means 29a points to the mark on disc 12 corresponding to the sun's azimuth noted from the table. The observer may then sight along the axis of sight members 26 and 27 while holding horizontal wires 26b and 27b in parallel relation to the horizon line of the earth and while rotating the entire device, including base plate 11, until vane 41 casts its minimum width of shadow as previously described. With the instrument thus oriented in horizontal position and vane 41 parallel to the path of the sun's rays, the sight line between sights 26 and 27 will then be along the desired true course and the observer may readily determine whether or not the ship is proceeding along this predetermined course.

The instrument of the present invention may, if desired, be employed to measure the altitude of the sun or moon above the horizon by orienting base plate 11 in a vertical plane and parallel to the path of the light rays from the particular celestial object. In order to make this measurement, disc 12 is preferably adjusted until meridian line 15 is aligned with index marks 24 and 25. The observer may then hold the instrument so that normally vertical wires 26a and 27a are horizontal and appear coincident with the horizon line of the earth. Holding the instrument in this position, the observer may adjust knob 34 until the image of the celestial object appears upon the inner end of the upper side of vane 41 in perfect horizontal alignment with the line of sight from wire 27a to 26a. With vane 41 locked in the thus adjusted position, the angle between vane 41 and meridian line 15 may be read from the position of index 29a over the protractor scale of disc 12. The angle thus measured, when multiplied by two, expresses the angular elevation of the celestial body above the horizon.

While the device of our invention is particularly useful in navigation and hydrographic surveying, it is apparent also, that it may also be used in surveying on land. Even though the device may conveniently be held in the observer's hands, it will be evident that in certain applications the instrument may also be suitably mounted upon a portable tripod or other form of pedestal.

Although we have described specific embodiments of the apparatus of our invention and the method of using the same, it will be apparent to workers in the art that other modifications and variations may be made without departing from the scope of our invention as defined in the appended claims.

We claim:

1. An azimuth measuring device comprising a horizontally orientable base plate, a protractor disc having equally spaced divisions marked around the circumference thereof, said disc being rotatably mounted at its center adjacent the upper surface of said base plate in a plane parallel to said plate, means for rotating said disc with respect to said plate, sighting means including as an integral part thereof indices cooperating with said spaced divisions, said sighting means and indices being affixed to the upper surface of the plate and spacedly aligned upon diametrically opposite sides of said disc, means associated with said plate for indicating horizontal orientation thereof, a member carried by said base plate and mounted for rotation in a plane above and parallel to said disc, said member defining a radial index line perpendicular to the axis of rotation thereof and cooperating with said spaced divisions, means for rotating said member about an axis passing perpendicularly through the center of said disc, and aligning means responsive to illumination from a major celestial body, said aligning means being mounted upon said member for indicating precise alignment of said radial index line with the azimuth of said major celestial body.

2. An azimuth measuring device in accordance with claim 1 in which the aligning means includes a thin vane adapted to reflect solar illumination, said vane being rigidly mounted along said radial index line in a plane perpendicular to said disc.

3. An azimuth measuring device in accordance with claim 1 in which the aligning means includes two flat photovoltaic surfaces rigidly mounted upon said member in a manner such that said surfaces lie in two intersecting planes which are perpendicular to the disc and form an acute angle with one another and said radial index line bisects said acute angle.

JAMES H. DUNAWAY.
PAUL B. POWELL.

REFERENCES CITED

The following references are of record in the file of this patent:

UNITED STATES PATENTS

| Number | Name | Date |
|---|---|---|
| 335,647 | Spencer | Feb. 9, 1886 |
| 1,942,604 | Kennedy | Jan. 9, 1934 |
| 2,099,772 | Seidelhuber | Nov. 23, 1937 |
| 2,155,402 | Clark | Apr. 25, 1939 |
| 2,440,827 | Marean et al. | May 4, 1948 |